US006433051B1

(12) United States Patent
Purvis, II et al.

(10) Patent No.: US 6,433,051 B1
(45) Date of Patent: Aug. 13, 2002

(54) VERY HIGH SOLID CONTENT AEROSOL DELIVERY SYSTEM

(75) Inventors: Daniel Charles Purvis, II, Temple; Kenneth Charles Pechal, Rogers; John James Ach, Temple, all of TX (US)

(73) Assignee: Wilsonart International, Temple, TX (US)

( * ) Notice: Subject to any disclaimer, the term of this patent is extended or adjusted under 35 U.S.C. 154(b) by 0 days.

(21) Appl. No.: 09/497,242

(22) Filed: Feb. 3, 2000

Related U.S. Application Data

(62) Division of application No. 09/316,339, filed on May 21, 1999, now abandoned.

(51) Int. Cl.[7] .......................... C08L 23/18; C08L 9/00; C08L 9/02; C08L 9/06

(52) U.S. Cl. ...................... 524/270; 524/274; 524/575; 524/579; 524/834

(58) Field of Search ................................ 524/834, 270, 524/274, 575, 579

(56) References Cited

U.S. PATENT DOCUMENTS

| | | | | |
|---|---|---|---|---|
| 2,734,774 A | | 2/1956 | Manseau | |
| 3,101,906 A | | 8/1963 | Webber | |
| 3,198,442 A | | 8/1965 | Brenner | |
| 3,346,195 A | | 10/1967 | Groth | |
| 3,361,693 A | | 1/1968 | Geschwind | 260/29.3 |
| 3,415,426 A | | 12/1968 | Kleveland | |
| 3,595,821 A | | 7/1971 | Spector et al. | 260/25 |
| 3,754,710 A | | 8/1973 | Chimura | 239/597 |
| 3,806,028 A | | 4/1974 | Coffey | |
| 3,951,722 A | | 4/1976 | Howson et al. | 156/307 |
| 3,965,061 A | | 6/1976 | Bash et al. | 260/25 |
| 3,970,502 A | * | 7/1976 | Turner | |
| 4,036,673 A | | 7/1977 | Murphy et al. | |
| 4,037,016 A | | 7/1977 | Habeck et al. | |
| 4,074,033 A | * | 2/1978 | Wolinski et al. | |
| 4,074,861 A | | 2/1978 | Magers | |
| 4,097,000 A | | 6/1978 | Derr | 239/601 |
| 4,401,271 A | | 8/1983 | Hansen | 239/337 |
| 4,401,272 A | | 8/1983 | Merton et al. | 239/337 |
| 4,404,243 A | * | 9/1983 | Terpay | |
| 4,477,613 A | * | 10/1984 | Evans et al. | |
| 4,485,200 A | | 11/1984 | Perlinski et al. | 523/409 |
| 4,532,273 A | * | 7/1985 | Kadowaki et al. | |
| 4,533,254 A | | 8/1985 | Cook et al. | 366/176 |
| 4,783,389 A | | 11/1988 | Trout et al. | 430/137 |
| 4,897,137 A | | 1/1990 | Miller et al. | 156/157 |
| 5,066,522 A | | 11/1991 | Cole et al. | 427/422 |
| 5,194,299 A | * | 3/1993 | Fry | |
| 5,213,739 A | * | 5/1993 | Dickerson et al. | |
| 5,314,097 A | | 5/1994 | Smrt | |
| 5,409,987 A | | 4/1995 | Kalwara et al. | 524/519 |
| 5,444,112 A | | 8/1995 | Carnahan | 524/272 |
| 5,450,983 A | | 9/1995 | Stern et al. | 222/1 |
| 5,464,154 A | | 11/1995 | Nielsen | 239/597 |
| 5,639,025 A | | 6/1997 | Bush | 239/333 |
| 5,715,975 A | | 2/1998 | Stern et al. | 222/402.1 |
| 5,733,961 A | | 3/1998 | Purvis, II et al. | 524/433 |

FOREIGN PATENT DOCUMENTS

| | | |
|---|---|---|
| CA | 2063862 | 3/2000 |
| DE | 3028693 A1 | 11/1982 |
| EP | 0814139 A1 | 12/1997 |
| EP | 1053791 | 11/2000 |
| FR | 2 002 620 | 10/1969 |
| GB | 1047732 | 11/1966 |
| GB | 1211622 | 11/1970 |
| GB | 2 003 160 A | 3/1979 |
| JP | 48-26378 | 8/1973 |
| JP | 49-25032 | 3/1974 |
| JP | 49-16104 | 4/1974 |
| JP | 51-7042 | 1/1976 |
| JP | 52-30838 | 8/1977 |
| JP | 54-30232 | 3/1979 |
| JP | 55-000724 | 1/1980 |
| JP | 58-101173 | 6/1983 |
| JP | 05-295336 | 11/1993 |
| JP | 8-134419 | 5/1996 |
| JP | 45-22239 | 7/1997 |
| JP | 10-88091 | 4/1998 |

OTHER PUBLICATIONS

"Innovation through Microfluidizer Technology," Microfluidics International Corporation, pp. 1–8 (1995).
Japanese Abstract—JP7184611, Jul. 25, 1995.
Japanese Abstract—JP5262641, Oct. 12, 1993.
Japanese Abstract—JP 08 337765 A, Dec. 24, 1976.
Japanese Abstract—JP 10 204398 A, Apr. 8, 1998.
Japanese Abstract—JP 62 205177 A, Sep. 9, 1987.
U.S. patent application Ser. No. 09/126,383, Purvis, II et al., filed Jul. 30, 1998.
Japanese Abstract—JP 07126593 A, May 16, 1995.
Japanese Abstract—JP 05295336 A, Nov. 9, 1993.
Japanese Abstract—JP 55000724 A, Jan. 7, 1980.
Japanese Abstract—JP 74016104 B, Apr. 19, 1970.
Japanese Abstract—JP 49025032 A, Mar. 6, 1974.
*Handbook of Adhesives*, 1977, Nostrand Reinhold, New York, "Neoprene Adhesives: Solvent and Latex" Murray Steinfink, XP–0021211193 pp. 343–362.
*Microfluidics Technical Bulletin 210EH–2*, "M–210–EH Pilot PLant Production Microfluidizer," 4 pages.
J. Bradrup et al., *Polymer Handbook*, fourth Edition (1999), VII/499.

* cited by examiner

*Primary Examiner*—Tae H. Yoon
(74) *Attorney, Agent, or Firm*—Baker Botts LLP

(57) ABSTRACT

The present invention relates to a very high solid content contact adhesive (VHS) which has a higher solid content than previously thought attainable in the prior art without increasing the viscosity beyond operable levels. Additionally, the present invention provides a VHS application device which allows substantially more uniform application of the VHS than was previously attainable.

9 Claims, 5 Drawing Sheets

VERY HIGH SOLID CONTENT AEROSOL DELIVERY SYSTEM

This application is a division of U.S. application Ser. No. 09/316,399 filed on May 21, 1999 now abandoned.

BACKGROUND OF THE INVENTION

1. Technical Field

The present invention relates to very high solid content aerosols and more particularly, to very high solid content aerosol adhesives and aerosol adhesive application devices.

2. Background of the Invention

In general, aerosol spray cans for a variety of aerosol products include a substance to be sprayed, an optional carrier fluid and a propellant. Typically, the propellant is a composition that pressurizes the can and assists in atomization of the substance being sprayed. In the past chlorofluorcarbons (CFC's) were widely used as propellants but, due to environmental concerns, these propellants are now banned by international agreement. The optional "carrier" may also, in some instances, pose an environmental or health hazards For example, in the case of paints and adhesives, a solvent is included in the composition that is sprayed. The solvent, often a "volatile organic compound" (VOC), ultimately vaporizes when the paint or adhesive "dries", to leave behind the sprayed composition. The vaporization of these solvents into the environment has now raised both health and environmental issues: do they pose a risk of adversely affecting human health and air quality? In response, industry has been seeking ways to reduce the amounts of organic solvents present in adhesive and other aerosol sprays that may pose a risk.

A reduction in solvent would also produce other benefits: as the proportion of solvent present in aerosol adhesive decreases, more of the adhesive composition itself is present in the aerosol. This results in reduction of waste to dispose of in the form of the packaging for the adhesive mixture (e.g., empty spray cans).

Thus, for example, spray can-applied adhesive solvent mixtures containing 20–25% by weight adhesive compound, also known as very high solid content (VHS) adhesives, have become increasingly desirable in the field of contact adhesives because of their use of smaller proportions of organic solvents, and their potential for reduction of health and environmental hazards. Our copending U.S. patent application Ser. No. 09,126,383, entitled "Very High Solids Adhesive" filed Jul. 30, 1998, which is hereby incorporated by reference, discloses such a composition for a VHS adhesive and a method for making the VHS adhesive. In a preferred embodiment, the adhesive is comprised of a resin/rubber/solvent mixture. The resins used typically include polyterpene resins, phenolic resins, phenolic modified terpene resins, aliphatic petroleum hydrocarbon resins, and the like. The rubbers used in the adhesive mixtures generally use a blend of polychloroprene synthetic rubbers. A wide range of solvents may be used depending on the composition of the adhesive with which it must be compatible to form a solution. Thus, the solvents used may include, among others, various chlorinated solvents, ketones, aliphatics, aromatics, alcohols, and esters.

However, it has been found that in practice using VHS adhesives can be quite difficult. For example, in general, as the solid content of the adhesive increases. the viscosity of the adhesive solvent mixture increases. When using standard nozzles and buttons on typical aerosol spray cans, the increased viscosity causes the spray pattern of adhesive mixture from the can to be uneven. For example, if a standard can, valve, and button (such as variable valve Model #V8-10-118, with a 906 collar and button Model #166-197-1620-white, both provided by Newman-Green of Addison, Ill.) are used to spray a VHS adhesive solvent mixture having 30 wt % adhesive, such as neoprene, the spray tends to be uneven. That is, the spray pattern will have varying concentrations across the area of application. It is believed that this generally occurs because the button contains a substantially circular shaped exit port through which the VHS adhesive mixture stream passes so that there is limited or no "fanning" of the spray; the stream exits in a substantially straight line. Additionally, even if some outward "fanning"should occur, the fanning is not controlled and the concentration of the sprayed fluid is not uniform and tends to vary throughout the application area.

Various nozzles for attachment to the spray buttons have been designed to try to overcome the nonuniformity of spray problem. U.S. Pat. No. 4,401,272, issued to Merton et al., on Aug. 30, 1983, and U.S. Pat. No. 4,401,271, issued to Hansen, on Aug. 30, 1983, each disclose nozzles which attach to aerosol spray can buttons. These nozzles do not appear to resolve the issue. For example, the '272 patent discloses that the nozzle is only capable of spraying mixtures with solid content levels up to 11.1%, well below typical VHS levels. When such nozzles are used, the spray tends to be more concentrated at the top and bottom of the spray area and less concentrated near the center of the spray area. The '271 patent provides another attempt at a solution to the "nonuniformity of spray" issue.

As explained above, there is a need for a VHS adhesive solvent mixture with higher workable solids contents than heretofore known and a device for applying such a mixture substantially uniformly.

SUMMARY OF THE INVENTION

The present invention provides a very high solid content contact adhesive (VHS) which has a higher solid content than previously attainable in the prior art without increasing the viscosity beyond operable levels. Additionally, the present invention provides a VHS application device which allows substantially more uniform application of the VHS than was previously attainable.

BRIEF DESCRIPTION OF THE DRAWINGS

Additional aspects of the present invention will become evident upon reviewing the non-limiting embodiments described in the specification and the claims taken in conjunction with the accompanying figures, wherein like numerals designate like elements, and:

DETAILED DESCRIPTION OF PREFERRED EXEMPLARY EMBODIMENTS

Figure 1:
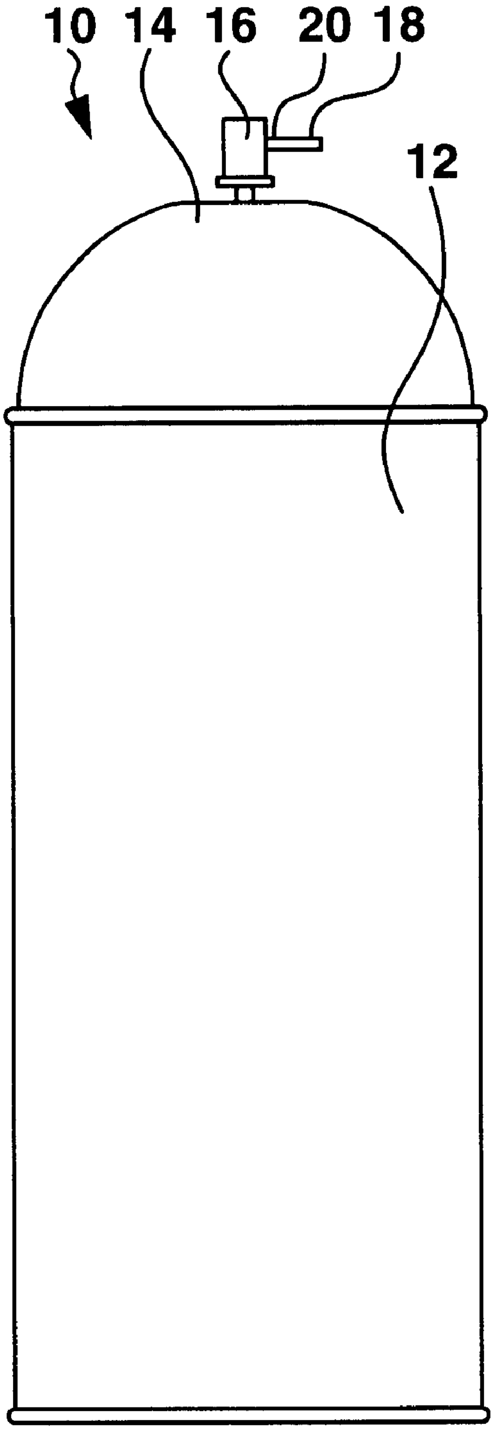
FIG. 1 is a side view of a VHS adhesive spray can.

The following descriptions are of preferred embodiments, and are not intended to limit the scope, applicability, or configuration of the invention in any way. Rather, the following description provides a convenient illustration for implementing a preferred embodiment of the invention. Various changes may be made in the function and arrangement of elements described in the preferred embodiments without departing from the spirit and scope of the invention as set forth in the appended claims. In addition, while the following detailed description is generally described with respect to certain VHS adhesive mixtures, the invention is also applicable to other higher viscosity mixtures that are propelled or applied through an aerosol spray can. Moreover, the nozzles of the invention are not limited to those described specifically herein, but encompass those that are equivalent to the ones described.

In the specification and claims, the term VHS refers to "very high solids content". While the following description relates mainly to VHS adhesives, it is clear that the principles discussed and devices described are also applicable to other VHS substances that are supplied and propelled through aerosol cans, for instance, paints, lacquers, polishes, waxes and the like.

The term "very high solids content" in the context of an adhesive solvent mixture relates to the viscosity of the mixture. As the solids content increases, generally so does the viscosity of the mixture, but the "shearing" mixing method of our prior application, described below, minimizes viscosity increase with increase in adhesive content. In this context, "very high solids content" refers to a shear mixed mixture that has a viscosity that is in the range of at least about 50 cps, preferably about 200 to about 400, and up to about to 600 cps. Thus, VHS, although related to adhesive concentration in an adhesive solvent solution, may also be appreciated in the context of viscosity. For specific adhesives, such as neoprene, an adhesive commonly used for adhering decorative laminates to substrates, a VHS adhesive/solvent mixture contains at least about 28 wt. % neoprene, preferably about 28 to about 30 wt % neoprene, and most preferably about 29 to about 31 wt. % neoprene based on the weight of the mixture of neoprene and solvent.

With respect to VHS adhesive/solvent mixtures, the adhesives include neoprene, styrene butadiene (SBR), styrene isoprene styrene (SIS), nitrile, and the like. Solvents may be selected from those compositions compatible with the adhesive and include, among others, various chlorinated solvents, ketones, aliphatics, aromatics, alcohols, esters, and the like.

The VHS adhesive itself may be selected from any of those that are commercially useful. VHS adhesives useful in the decorative laminate arts may be formed using any one of many useful processes, including for example the shearing mixing process disclosed in U.S. Pat. No. 5,733,961 to Purvis II, et al., issued Mar. 31, 1998, which is hereby incorporated by reference. The shearing is generally done using a Microfluidizer® processor (made by Microfluidics International Corp. of Newton, Mass.) utilizing an electrically driven, dual plunger or piston, hydraulic intensifier pump which pressurizes the fluid product. The neoprene and solvent are mixed in the kettle process and the Microfluidizer® suitably moves a stream of the mixture at extremely large pressures and speeds. The stream is then suitably split in two parts, its direction changed and cause to collide with itself in rapid succession. The process creates shearing, impact and cavitation effects within the mixture. These effects dramatically reduce the size of particles within the mixture, thereby lowering the viscosity of the mixture and enabling additional neoprene to be introduced to the mixture. Accordingly, the weight percentage of the neoprene solvent mixture may be increased into even higher solid content ranges than previously thought possible without unduly increasing the viscosity of the mixture.

Figure 2:
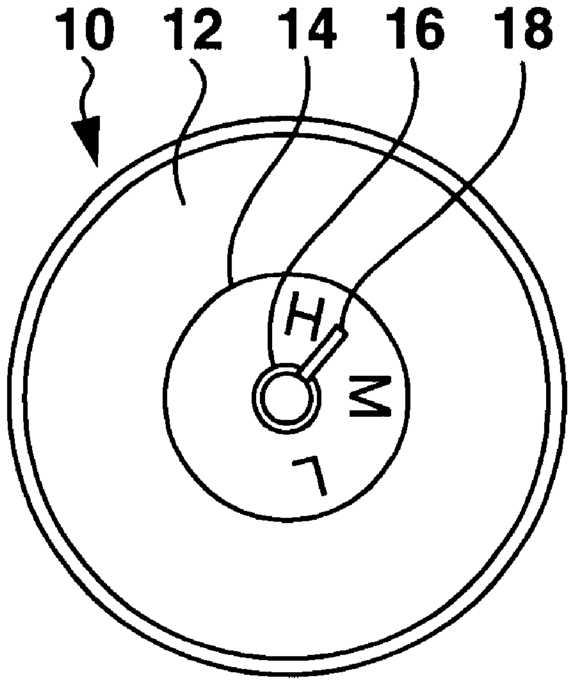
FIG. 2 is a top view of a VHS adhesive spay can.

The invention also provides a delivery system for the VHS adhesive/solvent mixture. The delivery system requires an aerosol can, and includes the use of a propellant. With reference to FIGS. 1 and 2, in accordance with a preferred embodiment of the present invention, spray device 10 is capable of substantially uniformly applying a coating of the VHS adhesive/solvent mixture to a substrate. In the present embodiment, spray device 10 is an aerosol spray can comprised of a can 12, a valve 14 at an upper end of can 12, a button 16 mounted to valve 14 to open the valve, and a nozzle 18 fitted to the button, as explained below. Can 12 is generally any suitable pressurizable aerosol spray can capable of containing the VHS, solvent and propellant mixture. Valve 14 may suitably be any conventional aerosol spray can valve, though, in accordance with the present preferred embodiment, valve 14 may be selected from variable valve Model #V8-10-118 and equivalent valves, with a 906 or equivalent collar both provided by Newman-Green of Addison, Ill. Variable valve 14 allows the adjustment of the flow rate through valve 14, button 16 and nozzle 18 by rotation of button 16 around can 12. In the present preferred embodiment, valve 14 suitably contains markings designating "low", "medium" and "high" rates of flow which aid in the determination of the flow rate through valve 14. Button 16 is any suitable conventional aerosol spray can button, and, in accordance with the present exemplary embodiment, may be selected from Model #166-197-1620-white button, also provided by Newman-Green, and its equivalents.

Figure 3:
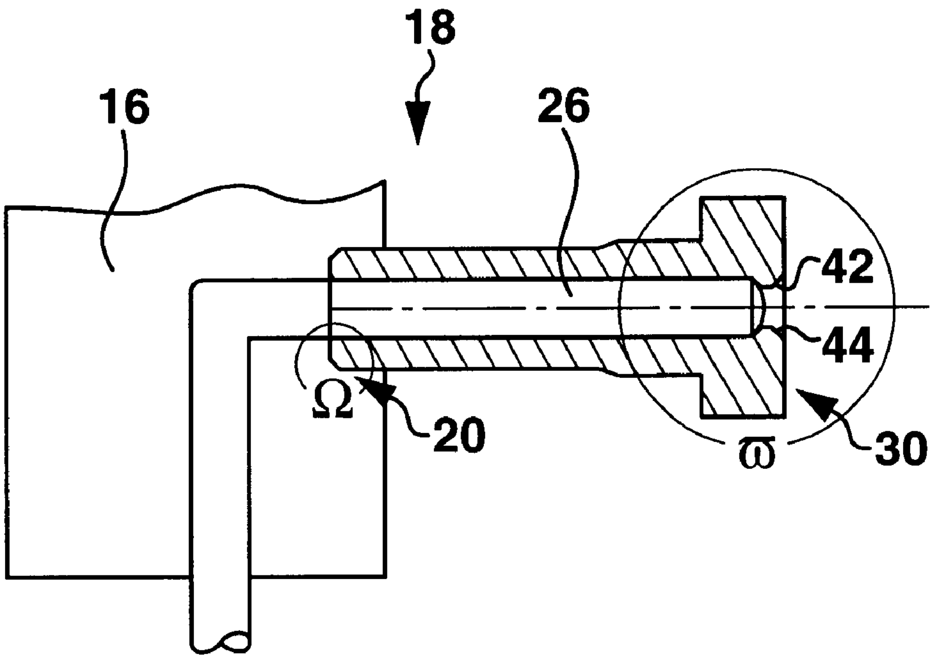
FIG 3 is a cross-sectional side view of an exemplary embodiment of a nozzle and button of the present invention.
Figure 4:
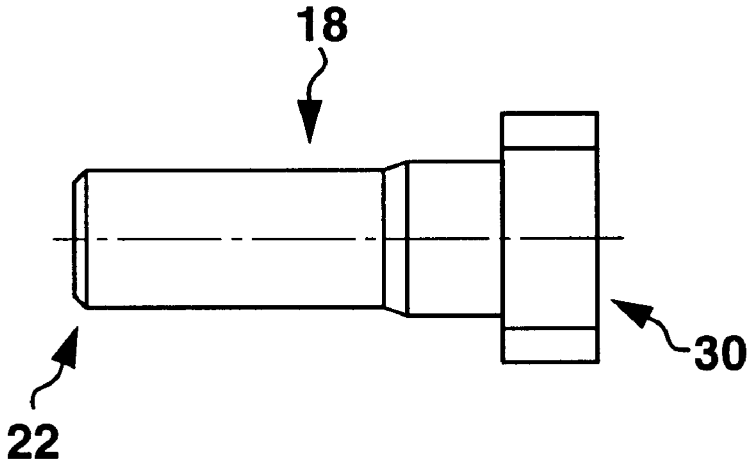
FIG. 4 is a side view of an exemplary embodiment of a nozzle of the present invention.
Figure 5:
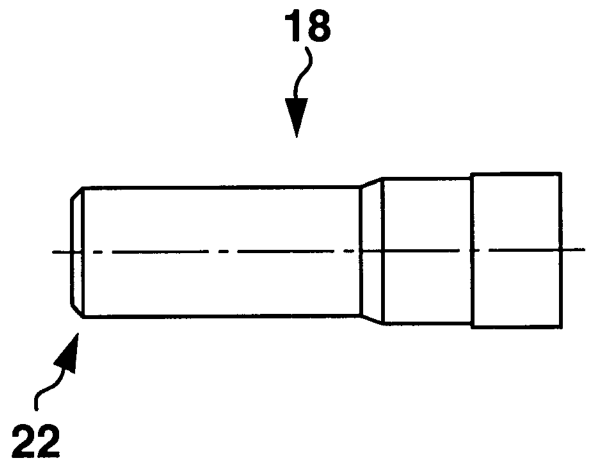
FIG. 5 is a top view of the present invention.

With reference now to FIGS. 3–5, the illustrated embodiment of the nozzle 18 of the invention is configured as an elongated body member formed from any material resistant to any corrosive or other deleterious effects of the VHS adhesive/solvent mixture and should itself not contaminate the fluid being sprayed. For example, inert plastic, metals and the like.

Figure 6:
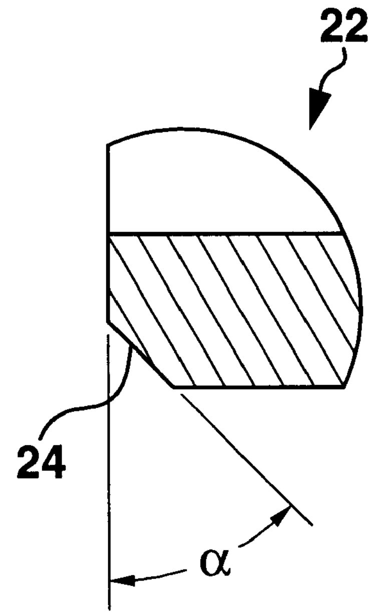
FIG. 6 is a close-up cross-sectional side view of a chamfered insertion end of the nozzle of the present invention.

In accordance with the present preferred embodiment of the present invention, nozzle 18 is adapted for use with button 16. For example, according to one aspect of the present exemplary embodiment, the substantially cylindrical or tapered shape of nozzle 18 has an insertion end 22 and an adhesive spray exit end 30. In the present embodiment, nozzle 18 has a diameter of approximately 0.120 in. (3.05 mm). Insertion end 22 is suitably sized for mounting to a button exit port 20 for fluid communication between the port and the throughbore 26 of the nozzle 18 when valve 14 is open. In accordance with the illustrated embodiment, nozzle 18 is either releasably or permanently press fit into button exit 20 of button 16. However, alternatively, insertion end 22 may be mounted to button exit port 20 by other means, including helical threading, adhesives and the like. Also, the nozzle 18 may be integrally formed on button 16 to produce a one-piece button with nozzle 18. Additionally, with momentary reference to FIG. 6, insertion end 22 may optionally include a chamfer 24 formed by an angle a in order to facilitate the mounting of insertion end 22 to exit port 20 of button 16. For example, in the present exemplary embodiment, chamfer 24 is about 0.0125 in. (0.32 mm) deep and angle a is about 45°.

Figure 7:
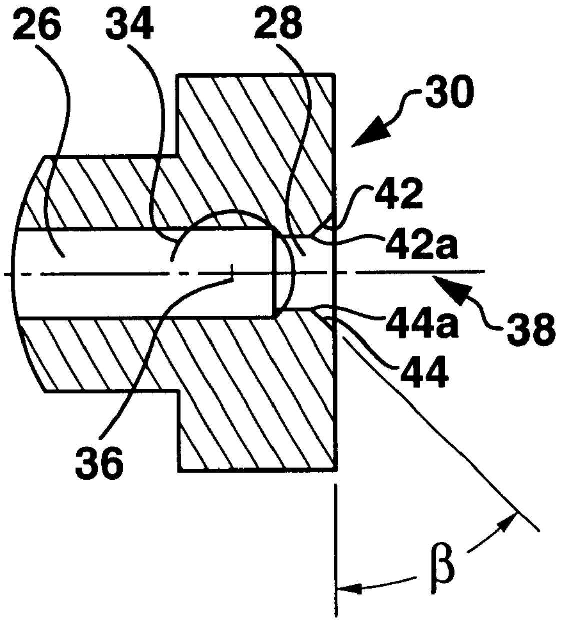
FIG. 7 is a cross-sectional close-up view of the exit end of the nozzle.

In accordance with another aspect of the present invention, and with reference now to FIG. 7. nozzle 18 is suitably configured with an axial throughbore or cannula 26 extending lengthwise therethrough. Throughbore 26 is of substantially uniform diameter along a major portion of its length but has a flow restrictor 28 near its exit end 30. The restrictor 28 results in a reduction in cross sectional area for fluid flow through nozzle 18, causing a decrease in fluid pressure in restriction 28. In accordance with the present exemplary embodiment, the ratio of the cross-sectional area for fluid flow of throughbore 26 to the cross-sectional fluid flow area of restrictor 28 is about 4.7

Beyond restrictor 28 the tip of nozzle 18 assumes a substantially rectangular shaped exit port and has at least one pair of opposed sidewalls that flare outwardly towards the exit end 30 as described below.

In accordance with various aspects of the present invention, the diameters (or cross-sectional area for fluid flow) of the major throughbore portion 26 and restrictor 28 suitably vary depending on factors such as the solid content of the VHS passing through nozzle 18, the viscosity of the VHS, the intended concentration of the sprayed adhesive, and the desired spray pattern. In the present exemplary embodiment, the major throughbore portion 26 suitably has a diameter of about 0.062 in. (1.57 mm) and flow restrictor 28 has a substantially rectangular shape with a long side 46 and a short side 48. In the present exemplary embodiment, long side 46 is preferably about 0.040 in. (1.02 mm) and short side 48 is preferably about 0.016 in. (0.41 mm). Additionally, in accordance with the present exemplary embodiment, as the viscosity of the VHS decreases, the cross-sectional area of restrictor 28 also may be decreased, while, as the viscosity of the VHS increases, the cross-sectional area of restrictor 28 desirably increases. For example, if the viscosity of the VHS decreases to 50 cps, the cross-sectional area for fluid flow of restrictor 28 may be decreased about 20% relative to the area based on the preferred dimensions described above. On the other hand, if the viscosity of the VHS increases to 400 cps, the cross-sectional area for fluid flow of restrictor 28 may be about 30% larger than the area based on the above described dimensions.

According to another aspect of the present exemplary embodiment, to facilitate fluid flow and maintain a uniform flow pattern, throughbore portion 26 transitions gradually to the narrower throat of restrictor 28. This is achieved by curving the terminal end of major portion 26 uniformly inward in a radius of curvature 34 to form the walls of the preferred substantially rectangular exit port. The radius is about 0.0302 in. (0.77 mm) with a center 36 that is located 0.0503 in. (1.28 min) from exit end 30, along a centerline 38 of throughbore 26.

Figure 8:
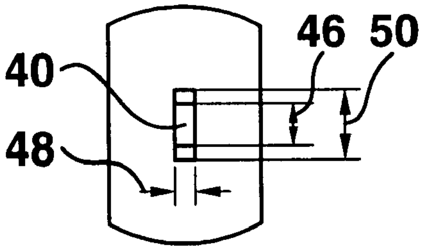
FIG. 8 is a front view of the exit end of the nozzle.

In accordance with another aspect of the present exemplary embodiment, and with reference to FIG. 8, an exit port 40 is suitably provided at exit end 30 of nozzle 18. Exit port 40 is suitably formed in a shape designed to facilitate spreading of the aerosol spray exiting therethrough into a fan shape. The preferred exit port, as described above, is of a substantially rectangular shape, with vertical opposed sides longer than horizontal sides. Exit port 40 is suitably formed with an outward flare from the restrictor 28 that has at least one pair of opposing sidewalls that form the upper and lower walls 42, 44 of the rectangular shaped port 40 that facilitate shaping of the spray. Sidewalls 42,44 flare outward at an angle β which suitably widens from starting points 42*a,* 44*a* on restrictor 28 to the nozzle face or tip to direct the spray. In the embodiment shown, for a VHS adhesive solvent mixture of viscosity about 200 cps, an angle β of about 20° to 75° is operable, and about 45° is preferred, while the length of a flare exit long side 50 is about 0.0471 to 0.1125 in. (1.20 to 2.86 mm), and preferably about 0.0663 in. (1.68 mm). When the viscosity is greater or smaller, experimental testing of β angles will lead to selection of an optimum flare angle.

Thus, while the principles of the invention have been described in illustrative embodiments, many combinations and modifications of the above-described structures, arrangements, proportions, the elements, materials and components, used in the practice of the invention in addition to those not specifically described may be varied and particularly adapted for a specific environment and operating requirement without departing from those principles.

We claim:

1. A very high solid content contact adhesive comprising:

(a) a mixture of an adhesive and a solvent, the mixture comprising:

(i) at least about 28 wt % of an adhesive, the adhesive being selected from the group consisting of neoprene, styrene butadiene (SBR), styrene isoprene styrene (SIS), and nitrile; and (ii) a solvent, the solvent being selected from the group consisting of aromatics, ketones, aliphatic, alcohols, and esters;

(b) wherein the mixture has a viscosity of from about 50 to about 600 cps.

2. A very high solid content contact adhesive according to claim 1, wherein said adhesive comprises neoprene.

3. A very high solid content contact adhesive according to claim 1, wherein said mixture further comprises weight percentage from about 29 to about 31% of a rubber adhesive.

4. A very high solid content contact adhesive according to claim 1, wherein said viscosity of said mixture is from about 50 to about 400 cps.

5. A very high solid content contact adhesive according to claim 1, wherein said viscosity of said mixture is about 200 cps.

6. A very high solid content contact adhesive according to claim 2, wherein the viscosity of said mixture is from about 50 to about 400 cps.

7. A very high solid content contact adhesive application according to claim 2, wherein said viscosity of said mixture is about 200 cps.

8. A very high solid content contact adhesive according to claim 2, wherein the mixture comprises from abut 29 % to about 31 % by weight neoprene.

9. A very high solid content contact adhesive according to claim 1, wherein said adhesive comprises a resin selected from the group consisting of polyterpene, phenolic, phenolic modified terpene, and aliphatic petroleum hydrocarbon resins.

* * * * *

UNITED STATES PATENT AND TRADEMARK OFFICE

CERTIFICATE OF CORRECTION

PATENT NO. : 6,433,051 B1
DATED : August 13, 2002
INVENTOR(S) : Daniel Charles Purvis, II, Kenneth Charles Pechal and John James Ach It is certified that error appears in the above-identified patent and that said Letters Patent is hereby corrected as shown below:

Title page,
Item [73], should read as follows:
-- [73] Assignee: Premark RWP Holdings, Inc. --

Signed and Sealed this

Eighth Day of October, 2002

*Attest:*

JAMES E. ROGAN

*Attesting Officer*

*Director of the United States Patent and Trademark Office*